Sept. 17, 1935.   B. R. TEARE, JR., ET AL   2,014,870
ELECTRICAL REGULATION
Original Filed Nov. 15, 1932

Inventors:
Benjamin R. Teare, Jr;
Max A. Whiting,
by Harry E. Dunham
Their Attorney.

Patented Sept. 17, 1935

2,014,870

UNITED STATES PATENT OFFICE 2,014,870

ELECTRICAL REGULATION

Benjamin R. Teare, Jr., and Max A. Whiting, Schenectady, N. Y., assignors to General Electric Company, a corporation of New York Original application November 15, 1932, Serial No. 642,736. Divided and this application May 26, 1933, Serial No. 673,050

11 Claims. (Cl. 171—313)

Our invention relates to electrical regulation and particularly to automatic voltage and current regulation of battery charging circuits.

This application is a division of our application Serial No. 642,736, filed November 15, 1932, and assigned to the assignee of the present application.

An example of a practical use of our invention is to the control of the electrical system of automobiles. In order better to understand this use it will be helpful first to discuss briefly the electrical system of automobiles, with particular emphasis on the shortcomings of the usual system and a brief description of the characteristics of an ideal system.

Automobile electrical systems usually include an electrical generator, driven by the engine, a storage battery, and various load devices, such as the ignition system, lights, starter motor, horn, etc. The storage battery is provided for operating the various load devices when the engine is not running. Consequently, it is highly desirable that this battery be maintained in good condition, and as nearly fully charged as possible, at all times. The battery is charged by the generator when the engine is running and as the engine speed varies within wide limits it is necessary to provide some sort of regulating means to control the charging rate. The regulating means which has been generally adopted is a special design generator, known as the third brush generator. Such a generator, when operated at any one speed, has inherently a substantially constant-current characteristic, the values of current to which it regulates being different at different speeds but substantially unaffected by the resistance or by the counter-voltage of the load.

With such a system the charging rate tends to be constant at any given speed irrespective of the need of the battery. Such a charging characteristic has the following disadvantages. It is necessarily a compromise, or average, rate and therefore is too high when the battery is fully charged while it is too low to bring the battery quickly up to full charge if it is severely discharged. Furthermore, in such a system the voltage will vary widely with changes in circuit resistance. Thus, if there is a loose battery terminal the voltage will go up, in an effort to maintain constant current, and this high voltage will reduce greatly the life of the light bulbs. This effect is also produced, to a lesser extent, by changes in the battery voltage, as this is equivalent to a resistance change in the circuit.

An ideal system would be one in which the generator voltage was constant, at a value which would just maintain the battery fully charged after it became fully charged. With such a system a fully charged battery could not be injured by prolonged driving. Also, the charging rate, or current, would increase in proportion to the state of discharge of the battery because as the battery became discharged its counter voltage would decrease and consequently a greater net voltage would be available for circulating the charging current. A greatly discharged battery would therefore be quickly brought up to full charge. Also, as the voltage was constant, the life of the light bulbs would be prolonged.

An ideal system should also have the charging circuit so arranged that for any given state of charge of the battery the charging current should be as high as the battery could stand. This is because such an arrangement would most quickly bring a discharge battery up to full charge. Such a rate is one which is just below the rate which produces gassing, because it is the gassing which is injurious to a battery. It has been found that the maximum non-gassing current of a lead storage battery, for any state of charge, is substantially directly proportional to the percentage by which it lacks full charge.

It is not particularly difficult to provide a voltage regulator which will maintain constant voltage but, for certain practical reasons, a simple, or ideal, constant voltage system is not always feasible. One reason is that in order to supply the maximum non-gassing charging current to a greatly discharged battery it is necessary to provide an excessively large generator. If a smaller generator is employed it will be necessary to provide means for preventing its being overloaded while permitting it to supply charging current at the maximum non-gassing rate within its capacity.

In accordance with one feature of our invention we provide novel means for accomplishing this result.

Another reason that the simple constant voltage system is not always feasible is that the spread between the constant generator voltage and the battery voltage will preferably be quite small. As the voltage of the generator drops to zero when it is at rest, all automobile systems are provided with a reverse current relay, or cutout, for preventing discharge of the battery at such times. The cutouts have a winding, responsive to the voltage of the generator, for closing the charging circuit when the generator voltage exceeds the battery voltage. With a simple constant voltage system the spread between these voltages will often be insufficient to give reliable and positive cutout action.

In accordance with another feature of our invention we provide novel means for securing positive and reliable cutout operation in a constant voltage system.

An object of our invention is to provide a new and improved regulator which is particularly adapted for use with variable speed battery charging generators.

Another object of our invention is to provide a novel generator voltage regulator which holds a substantially linear relation between generator voltage and generator current between certain limits of said current and which causes relatively abrupt changes in said relation at current values outside said limits.

Our invention will be better understood from the following description, taken in connection with the accompanying drawing, and its scope will be pointed out in the appended claims.

In the drawing, in which similar reference characters denote similar elements throughout the several figures, Fig. 1 shows the structural details of one feature of our regulator.

Figure 1:
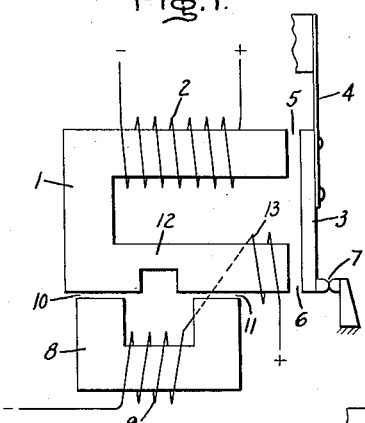

Referring now more particularly to Fig. 1: A side view is shown of an electromagnet of the horseshoe type having a main core 1 which is substantially U-shaped and which is provided with a magnetizing winding 2, preferably of the shunt type. A magnet armature 3, mounted on a spring 4, or other equivalent support, is controlled by the flux across main air-gaps 5 and 6 (principally by the flux across 6) so that when the flux exceeds a certain value armature 3 will operate a circuit controller, such as opening a set of contacts 7, for example. As shown, spring 4 is attached, at its upper end, to a fixed support. Main air-gaps 5 and 6 are preferably of equal reluctance.

Associated with main core 1 is a magnetic shunt member 8, which is illustrated as being U-shaped. A magnetizing winding 9, which is preferably of the series type, is provided for member 8. The magnetic circuit of U-shaped shunt member 8 is completed through a portion of main core 1. Reluctance, preferably in the form of air-gaps, is introduced into the path of the flux excited by winding 9. For this purpose, any number of air-gaps may be used, outside of member 1 but variously arranged as preferred. As examples, one air-gap may be used, located at 10, or at 11, or air-gaps at both 10 and 11, as shown. Also air-gaps may be interposed transversely within member 8, if desired. The total reluctance of these air-gaps 10, 11 or the like is preferably much less than that of the sum of main air-gaps 5 and 6. The total length and surface of member 8 should preferably be not unnecessarily great and the cross-section of 8 should preferably be equal to, or somewhat greater than, that of the main body of 1.

Magnet core 1 has a portion thereof which is preferably more readily magnetically saturable than the remainder, such as a restricted section 12 of short length. We have found that a restricted section of about one quarter of an inch in length gives satisfactory results in a structure in which the legs of core 1 are about one and a half inches long. This restricted section is located between the faces of air-gaps 10 and 11. Restricted cross-section 12 should preferably be saturated by not more than approximately one-half of the flux which would be required to saturate 8, or the unrestricted cross-section of 1. Specifically, if elements 1, 8 and 12 are of like material the restricted cross-section 12 should preferably be not more than approximately one-half that of 1 or 8. For best results it is important that there be no appreciable air-gap reluctance between restricted section 12 and the remainder of magnet core 1. To this end restricted section 12 should be of one piece with the remainder of 1.

Armature 3, if preferred, may be of much less cross-section than 1.

The magnetic material may be ordinary cold-rolled steel, or the like, and should preferably be given a thorough magnetic anneal. If preferred, a higher grade material such as magnetically annealed ingot iron, or silicon steel, may be used.

The various proportions, including the air-gaps and the strength of shunt type winding 2 are so chosen that with a normal exciting current in winding 2, but no current in winding 9, the magnetic flux densities are substantially below saturation, even in restricted section 12 and armature 3, and are far below saturation in 8 and the unrestricted sections of 1.

For reasons appearing hereinafter it may be preferable in some embodiments to use a winding 13 connected electrically in series with winding 9, although in other embodiments winding 13 may be of no advantage. When used, winding 13 is placed about magnet core 1 and so connected that when energized by current in the normal direction winding 13 opposes winding 2.

The operation of the magnetic circuits of Fig. 1 will now be described in a general way, deferring until later the explanation of the effect of winding 13 and of certain leakage effects and certain effects of iron reluctance. In order to facilitate an understanding of the operation of the specific illustrated embodiments of our invention, from the drawing, the normal polarity of the various windings in Figs. 1, 3 and 5 have been indicated.

Assume that the current in winding 9 is zero and assume normal current is passed through winding 2, which is connected to excite a flux in core 1 in a counterclockwise direction. Since restricted section 12 is unsaturated under this condition, and is of short length, its reluctance is substantially zero with respect to that of air-gaps 10 plus 11 in series. Hence most of the flux excited by winding 2 passes through 12 rather than through 8.

Let winding 9 be so arranged that when energized by current in a normal direction it excites a component of flux whose direction through 8 is from left to right and whose direction through 12 is from right to left. This component of flux thus traverses an auxiliary magnetic circuit comprising elements 8 and 12. Now assume that the current in winding 2 remains unchanged but that the current in winding 9 is increased from zero to a moderate value. The air-gaps 10 and 11 restrict to a moderate value the flux excited by the winding 9. Under this condition restricted section 12 forms a very low-reluctance path whereas main air-gaps 5 and 6 are of relatively high reluctance. Hence practically all of the flux excited by 9 is short-circuited by 12 and practically none of this flux escapes to cross main air-gaps 5 and 6. Therefore, the magnetic pull on armature 3 is substantially no different than at zero current in 9.

Now assume that the current in 9 is increased beyond this moderate value. As the flux excited by the current in 9 increases further, a condition is reached at which the iron of restricted section 12 begins to saturate. Thereupon the reluctance of section 12, heretofore negligible, increases rather suddenly to a value which, although still much less, is of substantial magnitude compared with the reluctance of main air-gaps 5 and 6. Accordingly, a substantial fraction of the flux excited by winding 9 crosses air-gap 6, thence passing along the length of armature 3 to cross air-gap 5, whence it returns through the upper and left-hand sides of 1. Thus, the energization of shunt winding 2 remaining constant, the magnetic pull across air-gap 6 begins to increase rather rapidly after the attainment of the above-mentioned current in winding 9 at which restricted section 12 begins to be saturated. At still further increase of current in winding 9 restricted section 12 becomes highly saturated and its reluctance becomes progressively much greater. The entire component of flux excited by winding 9 has now further increased and because of the progressively increased reluctance of 12 a progressively greater proportion of this component of flux crosses the main air-gaps 5 and 6, thereby increasing the air-gap pull at an augmented rate.

Figure 2:
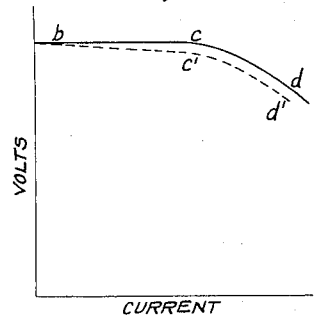
Fig. 2 shows the nature of the regulating characteristic provided when a structure in accordance with Fig. 1 is used as a vibrating-contact voltage regulator for a generator.

The action has been described on the basis that the current in winding 2 remains constant, so that increases of current in winding 9 beyond the value at which section 12 begins to be saturated cause increases of flux across main air-gaps 5 and 6. Consider now the action when the structure of Fig. 1 is used in a generator voltage regulator of the vibrating-contact type. Such a regulator is shown in complete detail in Fig. 5, in which windings 2 and 9 are responsive, respectively, to the voltage and current of a regulated generator. In such a voltage regulator the action is, fundamentally, that the regulator operation tends to maintain constant flux at its own main air-gap. That is to say, the regulator so operates as to maintain a dynamic, or vibrating, equilibrium between the force of spring 4 and the magnetic pull at air-gaps 5 and 6. When the current in winding 9 increases to a value at which restricted section 12 begins to saturate and when therefore a fraction of the flux excited by current 9 crosses the main air-gaps 5 and 6, as described hereinbefore, the condition of equilibrium between main air-gap pull and spring force is satisfied by a smaller value of that component of flux which is excited by shunt winding 2. Hence the regulator now regulates at a lower voltage impressed upon winding 2. The nature of the characteristic of voltage versus current resulting therefrom is represented in Fig. 2 in which dotted line $b\ c'\ d'$ is typical of results provided by certain embodiments, and solid line $b\ c\ d$ is typical of other embodiments.

In the foregoing general description of the operation of Fig. 1 we deferred the explanation of certain leakage and iron reluctance effects, which we now proceed to explain. At low and moderate currents in winding 9 and accordingly at low and moderate flux densities in restricted section 12, the reluctance of 12, although quite low, is not absolutely negligible compared with the reluctance of the main magnetic circuit through air-gaps 5 and 6. For this reason a small component of the flux excited by winding 9 traverses main air-gaps 5 and 6 even at currents less than saturating values of restricted section 12. Hence the regulation curve, unless otherwise compensated, may droop somewhat as shown by line $b$, $c'\ d'$ in Fig. 2. If this droop is greater than desired it may be corrected by the use of a differential series winding 13 whose arrangement has been described. As the current increases, winding 13 offers an increasing opposition to winding 2 hence increases the voltage required across winding 2 for the maintenance of vibrating equilibrium of the regulator. Hence, by the use of winding 13 the droop in characteristic $b\ c'\ d'$ can be compensated and a characteristic such as $b\ c\ d$ can be actually obtained.

In some embodiments we have obtained a characteristic substantially like that of $b\ c\ d$ without the use of differential series turns on member 1. It will be observed that in Fig. 1 spring 4 carrying armature 3 is supported at the top, farthest from air gaps 11 and 6 and member 8. Furthermore, the radius from the spring support or effective pivot of the armature 3, to the center of gap 6 is much greater than the corresponding radius to gap 5 so that most of the torque, or turning moment, for operating armature 3 is produced at air-gap 6. Using a vibrating regulator thus arranged but without differential series winding 13 we have obtained regulation curves substantially like $b\ c\ d$ of Fig. 2, in which the voltage is substantially constant between $b$ and $c$. We have tested also an arrangement differing only in that the assembly of contacts 7, armature 3, spring 4 and its support are upside down from the showing of Fig. 1 so that air-gap 6, which is near air-gap 11 and core 8, is effective at only a short radius and air-gap 5, which is remote from gap 11 and core 8, is effective at a long radius. With this latter arrangement in a vibrating regulator we have found that the voltage regulation is substantially drooping even at moderate currents, the characteristic resembling curve $b\ c'\ d'$ in Fig. 2 but with steeper droop throughout. It therefore tends to be important whether the center about which armature 3 oscillates is nearer gap 5 or is nearer gaps 6 and 11. We believe this difference of characteristic is caused as follows: Refer to Fig. 1 in which the pivot of armature 3 is near gap 5 but remote from gaps 6 and 11. Let the current in winding 9 increase to a moderate value at which the flux excited by winding 9 is substantial but less than the saturating value of restricted section 12. The reluctance of air-gap 11 is substantial hence some flux fringes outward proceeding from the right-hand end of member 8 to enter armature 3 at its rear surface, sides and bottom edge. This leakage flux, because of the directions at which it enters armature 3 does not add to the pull upon 3. After entering armature 3 from member 8 this leakage flux divides into two components, approximately one-half of which traverses armature 3 and crosses air-gap 5 additively to the main flux. The other half of the flux leaking from 8 to 3 traverses air-gap 6 against the direction of the main flux. Thus the leakage flux described increases the effective flux, hence the pull, across gap 5 and decreases the effective flux, hence the pull, across gap 6 by an equal amount. Since the lever arm of gap 6 is much greater than that of gap 5 the net torque upon armature 3 tending to open contacts 7 is decreased by the action of the leakage flux described. In a vibrating regulator this requires an increase of current in winding 2 to provide vibrating equilibrium against the effect of the leakage flux just described. It has been explained hereinbefore that the reluctance of restricted section 12 when unsaturated causes a slight droop such as $b\ c'$ in Fig. 2. By proper proportioning, the leakage effect just described can be made to compensate the droop $b\ c'$ so as to give substantially uniform voltage regulation between $b$ and $c$. To increase the compensating effect by the leakage flux described air-gap 11 may be increased in length and gap 10 correspondingly decreased in length. Conversely to decrease this compensating effect air-gap 11 may be decreased in length and air-gap 10 may be increased in length. Alternatively, or additionally, this compensation may be adjusted by positioning member 8 nearer to or farther from armature 3.

Conversely, if in Fig. 1 all else is unchanged but the assembly of contacts 7 and armature 3 and spring 4 with its support is inverted from that shown, the flux across gap 5, which is increased by the leakage as described, acts at the maximum lever arm and the flux across gap 6, which is correspondingly decreased, acts at the minimum lever arm. Hence this leakage flux in this arrangement accentuates the droop.

Still another leakage phenomenon is as follows: When restricted section 12 approaches saturation and its reluctance accordingly becomes substantial a substantial leakage flux occurs directly in parallel with restricted section 12. This increases the ampere-turns in winding 9 required for each degree of saturation of section 12. Hence, if the performance of a specific design is calculated without allowance for this leakage directly in parallel with restricted section 12, and if curve $b\ c\ d$ of Fig. 2 is taken to represent the performance on the basis of the simplified calculation, the actual curve will be found to have a less steep droop from $c$ to $d$, points beyond $c$ toward $d$ occurring at higher currents than calcu'ated. The effect predicted by the simplified calculation can be substantially eliminated in practice by increasing the sum of the air-gap lengths of 10 and 11, increasing also the number of turns of winding 9 over those of the simplified calculation, and furthermore, making sure that member 8 is of sufficient cross-section to keep it substantially unsaturated.

If the slope of the drooping part of the characteristic $cd$ is substantially as desired but it is desired that point $c$, at which the droop begins, shall occur at a higher current, winding 9 may remain unchanged and the sum of air gaps 10 and 11 may be increased. Conversely point $c$ may be made to occur at a lower current by decreasing air-gaps 10 and 11.

The performance may be affected, in some cases adversely, by the presence of other magnets, or of other iron bodies, very near the magnet structure of Fig. 1.

Figure 3:
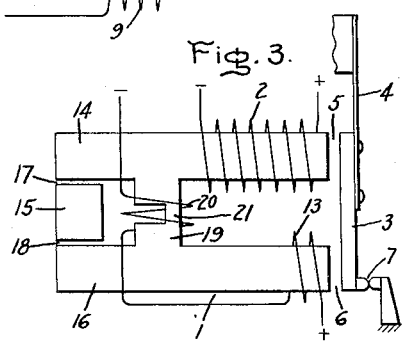
Fig. 3 shows the structural details of another feature of our regulator.

Turning now to Fig. 3, we show therein a side view of a magnet which differs from the magnet of Fig. 1 in that it is provided with extensions 14 and 16 between which there is a magnetic member 15. Reluctance is inserted between member 15 and members 14 and 16, preferably in the form of air-gaps 17 and 18, although but one air-gap may be used if desired. The reluctance of gaps 17 and 18 is preferably small with respect to the reluctance of main air-gaps 5 and 6. Members 14, 15 and 16, and air-gaps 17 and 18, form a magnetic shunt, or by-pass, about a portion 19 of the main magnet core. Member 19 is surrounded by a winding 20, which may be a series winding. Member 19 is rendered readily saturable in any suitable way, such as by a restricted section 21. We have found that a length of section 21 not greater than about one-fourth of an inch, gives good results. Winding 20 has a relatively large number of turns so that a relatively small current will cause enough flux to circulate via 19, 16, 18, 15, 17, and 14, to saturate restricted section 21 thoroughly. Restricted cross-section 21 should preferably be saturated by not more than approximately one-quarter of the flux which would be required to saturate elements 14, 15, and 16 and the unrestricted cross-section of 19. Specifically, if elements 14, 15, 16, 19 and 21 are of like material the restricted cross-section 21 should preferably be not more than approximately one-quarter that of 14, 15, 16 and 19.

The magnetic material should preferably be given a thorough magnetic anneal and may be of any of the grades mentioned in describing Fig. 1.

Armature 3, contacts 7 and spring 4 correspond to like parts in Fig. 1.

Winding 13 is preferably used in Fig. 2, arranged in the manner described under Fig. 1.

Neglecting, for the moment, the benefit derived from winding 13, which is explained hereinafter, the operation of the magnetic circuits of Fig. 3 is as follows: Assume zero current in series winding 20 and assume that normal current traverses shunt winding 2, which winding is connected to cause a flux in the counterclockwise direction, i. e. to the left through 14, down through 19, and to the right through 16. Since the restricted section 21 is unsaturated and is of short length its reluctance is substantially zero compared with that of air-gaps 17 and 18. Hence substantially all of the flux excited by shunt winding 2 passes through 21 rather than across air-gaps 17 and 18.

Let winding 20 be so connected that when energized by current in a normal direction a flux is excited thereby whose direction through 19 is downward i. e. is cumulative therein with the flux excited by winding 2. Now let the current in winding 20 be increased from zero to a relatively small value, the current in winding 2 being assumed unchanged. A relatively large component of flux will be excited in 19 by winding 20. The greater fraction of the flux so excited passes through the relatively short air-gaps 17 and 18 but another fraction crosses air-gaps 5 and 6 cumulatively with the main flux excited by winding 2. The pull on armature A is substantially increased thereby over that caused by the shunt excitation alone.

Now let the current in 20 undergo a further small increase. Restricted section 21 becomes partially saturated so that the further increase of flux excited by 20 is small, hence the flux crossing main air-gaps 5 and 6 undergoes only a slight further increase. A further increase of current in winding 20 causes restricted section 21 to become completely saturated so that substantially no further increase of flux is excited by winding 20 and consequently no further increase of flux occurs across air-gaps 5 and 6.

The action of Fig. 3 has been described on the basis that the current in winding 2 remains constant. Consider now the case in which the structure of Fig. 3 is used in a generator voltage regulator of the vibrating-contact type wherein windings 2 and 20 are energized in accordance with the voltage and current, respectively, of a generator, as in Fig. 5. As mentioned in explaining Fig. 1, such a regulator tends to maintain constant flux at its main air-gap. During the rise of current in winding 20 from zero to the relatively small value at which saturation occurs, the fraction of the flux excited by 20, and traversing main air-gaps 5 and 6 as described, aids in overcoming the force of spring 4 so that a reduced component of flux excited by winding 2 is sufficient for maintaining equilibrium. Hence the regulator now regulates at a lower voltage impressed upon winding 2 than it did at zero current in 20. Since restricted section 21 becomes completely saturated at a relatively small current in winding 20 further increases of current in 20 have very little further effect upon the main air-gap flux and the regulated voltage remains nearly constant at further increases of current in winding 20.

Figure 4:
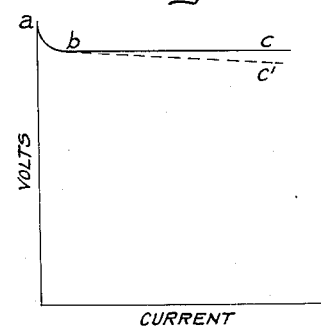
Fig. 4 shows the nature of the regulating characteristic provided when a structure in accordance with Fig. 3 is used as a vibrating-contact voltage regulator for a generator.

The nature of the characteristic of voltage versus current resulting from the above action is represented in Fig. 4. Point *b* represents the current at which restricted section 21 becomes substantially saturated. Even when the iron of restricted section 21 becomes saturated, further increments of current in winding 20 will cause slight increments of flux through 21. Hence if winding 13, or some other compensating means, is not present the characteristic will droop slightly beyond *b* as represented by dotted line *b c'*. By the use of differential series winding 13 this droop can be compensated, as will be understood from the explanation of the operation of winding 13 in Fig. 1 hereinbefore. Hence a substantially uniform regulated voltage can be obtained at currents greater than *b*, as shown by *b c* in Fig. 4.

The constructions of Fig. 1 and Fig. 3 may be combined in a vibrating voltage regulator to provide a characteristic having the initial droop, *a b* as in Fig. 4, thereupon a substantially flat voltage regulation as *b c* in Figs. 2 and 4 and at high loads a droop, as *c d* in Fig. 2. Such a combination is shown in Fig. 5 in which are included also the generator, battery and other essentials of a battery-charging system.

Figure 5:
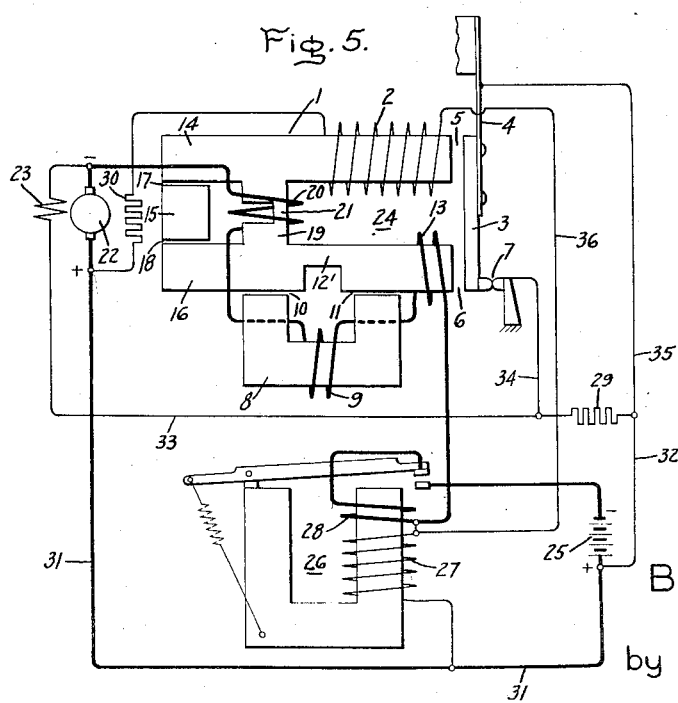
Fig. 5 shows a battery-charging generator system controlled by a vibrating-contact voltage regulator in which are included the features of Fig. 1 and Fig. 3.

Fig. 5 shows a generator 22 driven by any suitable source of power (not shown), typically a variable-speed prime mover, such as an automobile engine. Generator 22 has a shunt field winding 23 controlled by a vibrating-contact regulator 24 in accordance with our invention for the purpose of charging a storage battery 25.

A conventional cutout 26 is shown which closes automatically when the generator voltage rises to a predetermined value which has been selected to be higher than the maximum battery voltage. This cutout is arranged in the conventional manner with a shunt winding 27 and a series winding 28, the function of the series winding being to open the cutout whenever the generator voltage decreases sufficiently below that of the battery to cause a substantial discharge current from the battery into the generator.

A resistor 29 in series with generator field 23 is short-circuited intermittently by contacts 7 attached to the vibrating armature 3 of the regulator 24, to control the generator voltage.

A resistor 30 may be used in series with voltage, or shunt, winding 2 of the regulator 24.

In the single magnetic structure comprising the regulator 24 of Fig. 5 winding 2, contacts 7, armature 3, spring 4 and air-gaps 5 and 6 correspond to like-designated parts of Figs. 1 and 3. Winding 13 is preferably used in some embodiments of Fig. 5 but in other embodiments may not be preferred. Winding 13 corresponds to the like-designated part in Figs. 1 and 3. Winding 9, magnetic member 8 and air-gaps 10 and 11 correspond to like-designated parts of Fig. 1. Winding 20, air-gaps 17 and 18 and magnetic members 14, 15 and 16 correspond to like-designated parts of Fig. 3 except that member 16 has additionally a restricted section 12' corresponding in proportions and function to restricted section 12 of Fig. 1.

The action of the combination comprised by winding 9, member 8, air-gaps 10 and 11 and restricted section 12' is as described for Fig. 1. The action of the combination comprised by winding 20, member 19, restricted section 21, air-gaps 17 and 18 and member 15 is as described for Fig. 3. Thus the regulation provided by the regulator will have a volt-ampere regulation as in Fig. 6 characterized by a sudden initial droop of voltage at a small increase of current above zero, thence a substantially uniform voltage regulation over a substantial range of current increase and finally a relatively sudden droop of voltage beginning at a high current. According to the details of the embodiment the regulating characteristic may be of the type shown by dotted line *a b c' d'* or of the type shown by solid line *a b c d*, as explained more particularly hereinafter.

Figure 6:
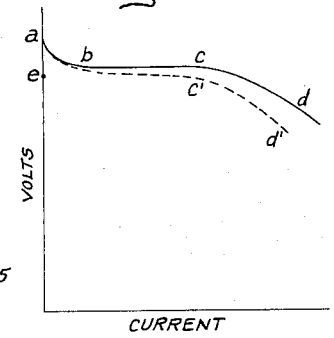
Fig. 6 shows the regulating characteristic of the arrangement of Fig. 5.

The regulator is preferably adjusted so that at condition *b* in Fig. 6 the regulated voltage is of a value to cause a suitably low "finishing" current to be delivered into the battery after full charge is attained, i. e. the coordinates of point *b* represent preferred "finishing" values of voltage and current.

The electric circuits of Fig. 5 are as follows: The main, or power, circuit, which is shown in heavy lines, starts from the positive terminal of generator 22, passes through a conductor 31 to the positive side of battery 25, then from the negative terminal of the battery through the contacts of cutout 26, then through series, or current winding 28 of the cutout, and then through current, or series, windings 13, 9 and 20 of the regulator, in series, and back to the negative terminal of generator 22. The energizing circuit for the field winding 23 of generator 22 may be traced as follows: From the positive side of the generator, through conductor 31, conductor 32, regulating resistance 29, conductor 33, field winding 23 and back to the negative side of the generator. Contacts 7 are connected, by means of conductors 34 and 35, so as to be capable of short-circuiting regulating resistance 29. The main control, voltage, or shunt, winding 2 of the regulator is connected across the generator 22 as follows: From the positive terminal of the generator 22, through resistance 30, winding 2, conductor 36, and back to the negative side of the generator 22 through the relatively low resistance current windings 13, 9 and 20 in series. Similarly, the potential, or shunt, winding 27 of cutout 26 is energized as follows: From the positive side of generator 22, conductor 31, the winding 27, and back to the negative side of generator 22 through the relatively low resistance current windings 13, 9 and 20 in series.

The vibratory contact regulator action of regulator 24 is believed to be well understood by those skilled in the art. Briefly stated, it is as follows: When contacts 7 are closed, resistance 29 is short-circuited, consequently the current in field winding 23 increases and the voltage of generator 22 increases. As soon as the voltage of generator 22 increases, the current in winding 2 increases, so that the flux in air-gaps 5 and 6 increases thereby attracting armature 3 and opening contacts 7. This causes resistance 29 to be inserted in the circuit of field winding 23, thereby reducing the current in this winding. This in turn reduces the voltage of generator 22 so that contacts 7 again close. This action is repeated very rapidly so that the voltage of generator 22 remains at a substantially steady normal value during normal operation.

The operation of Fig. 5 will now be described in a general way, deferring until later the explanation of certain small effects caused by leakages and saturation.

At very low speeds the generator 22 will generate insufficient voltage to close the cutout 26. As the generator speed increases its voltage will increase until the cutout is closed by its own voltage coil 27. Prior to the closing of the cutout no current flows in winding 20, consequently the regulator does not begin to regulate at any voltage less than voltage $a$ in Fig. 6. Although the cutout is adjusted so that it does not close under any condition at a voltage less than the battery terminal voltage, ($e$ in Fig. 6) an ample margin of voltage, up to $a$ in Fig. 6, is provided wherein to energize the cutout voltage winding sufficiently to close the cutout.

A moderate further increase of generator speed after the cutout has closed will cause the voltage to rise to a value at which regulation begins. By virtue of the construction of Fig. 3 as explained hereinbefore, the flow of even a small current from the generator to charge the battery causes the regulated voltage to decline from the no-load value $a$ to the value $b$ as in Fig. 6. At currents greater than $b$ in Fig. 6 the restricted section 21 is highly saturated, hence the feature of Fig. 3 exerts substantially no further effect. At currents less than $c$ in Fig. 6 the restricted section 12' is still unsaturated, hence the principal feature of Fig. 1 has not yet begun to exert its effect. The voltage between $b$ and $c$ is therefore regulated to a substantially constant value. If the charging current is greater than $c$, restricted section 12' becomes saturated, hence, as explained in connection with Fig. 1, the voltage regulation droops from $c$ to $d$ as in Fig. 6. A battery whose charge is substantially, but not absolutely, exhausted has a counter-electromotive force which although less than normal is nevertheless fairly high so that when charging is resumed the droop $c\ d$ effectively protects the generator against severe overload. Even when the battery has been absolutely discharged so that its open-circuit voltage is zero, the droop beyond point $d$ of Fig. 6 protects the generator against unlimited load at the instant when charging is resumed. It is our observation, moreover, that when a battery which is absolutely discharged, but not ruined, resumes charging, its counter E. M. F. rises almost immediately to roughly one-half normal so that the generator load declines almost immediately from the instantaneous inrush to a value such as point $d$ or $d'$ of Fig. 6.

In describing the operation of Fig. 3 we showed that a slight degree of droop, as $b\ c'$ in Fig. 4 occurs over the entire range of currents beyond value $b$ at which restricted section 21 becomes saturated. In describing the operation of Fig. 1 we showed that even the slight reluctance of restricted section 12 while still unsaturated tends to cause a slight droop such as $b\ c'$ in Fig. 1. When the constructions of Figs. 1 and 3 are combined as in Fig. 5, these two droops tend to be additive. Accordingly, the regulation tends to be very distinctly drooping in the manner of $b\ c'$ of Fig. 6. However, we have also shown that in the preferred arrangement of Fig. 1 magnetic leakage from the right-hand end of member 8 into the bottom, sides and rear of armature 3 compensates for droop tending to be caused by the initial reluctance of restricted section 12. By proper proportions and adjustment of the structure so that the leakage from 8 to the bottom, sides and rear of armature 3 is of sufficient magnitude both these effects can be compensated so that the voltage is substantially flat from $b$ to $c$ in Fig. 6. It may be preferred, however, to provide the compensation by the inclusion of differential series winding 13 connected and effective in the manner described under Figs. 1 and 3, thereby providing regulation at substantially uniform voltage between $b$ and $c$.

In a practical battery-charging installation, particularly in a 6-volt system on an automobile, the resistance of the cutout contact plus the resistance of the circuit between cutout and battery may be of very appreciable effect so that after care has been taken to compensate the regulator characteristic so as to obtain at the regulator terminals a closely constant voltage from $b$ to $c$, the charging voltage actually at the battery terminals may droop very substantially at the higher charging currents within the range $b\ c$. As will be understood by persons well versed in the battery charging art, a result of such a condition is that as the battery is brought up toward full charge, a substantial decline of charging current occurs earlier than necessary or advantageous, hence the maximum effectiveness of the system within the capacity of the generator is not obtained. To improve the effectiveness of charging under this condition it is practicable actually to over-compensate the regulator action by the use of sufficient differential series turns in winding 13 effective upon the main magnet core. A characteristic has been obtained thereby in which the voltage at the regulator terminals rises appreciably from point $b$ to point $c$ so as to compensate for nearly all of the resistance voltage drop between the regulator and the battery.

The regulator of Fig. 5 may be provided with adjustments for different conditions of service or to correct for slight variations in manufacture. To raise the entire level of the voltage in Fig. 6, i. e. to raise points $a$, $b$, $c$ and $d$ by approximately equal amounts the main air-gaps 5 and 6, or one of them as 6, may be lengthened thereby requiring a greater current in winding 2 to excite the necessary flux for vibratory operation of armature 3. To increase the current at which point $c$ occurs (i. e. the current at which the droop begins for the purpose of limiting the maximum generator current) air-gaps 10 and 11 are lengthened, thereby requiring increased currents in winding 9 for the attainment of equal degrees of saturation of restricted section 12'. The sudden droop in voltage from *a* to *b* may be increased most readily by increasing the reluctance of air-gaps 17 and 18, for example by positioning member 15 farther to one side in a manner which reduces the area of air-gaps 17 and 18. This does two things: it increases the required current in winding 20 for saturating restricted section 21, hence it moves point *b* to the right in Fig. 4 or Fig. 6 and it provides that a greater fraction of the flux excited by winding 20 traverses main air-gaps 5 and 6, hence it increases the spread vertically between point *a* and point *b*.

If it is desired to increase the droop from *a* to *b* but without an increase in the current at *b*, the reluctance of air-gaps 17 and 18 may be increased and turns added to winding 20.

The mechanical details for making and fixing the various air-gap adjustments described are not indicated in the drawing but can be readily supplied, as desired, as will be well understood by those skilled in the art.

While we have described what we at present consider the preferred embodiments of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, a generator, a load connected to be energized by said generator, a voltage regulator for said generator, and means operative through magnetic saturation in response to the current of said load for causing said regulator to reduce the voltage of said generator when said current exceeds a predetermined value, said means including a single winding for producing magnetic saturation in said regulator and for producing an operating magnetic flux for causing said voltage reduction.

2. In combination, a generator, a storage battery connected to be charged by said generator, an electro-magnetic voltage regulator for said generator including a magnet and a cooperating armature, and electro-magnetic means responsive to the charging current of said battery and operative upon said armature through magnetic saturation in said magnet for causing said regulator to reduce the voltage of said generator when said current exceeds a predetermined value, said means including a single current responsive winding for producing said magnetic saturation and for producing a flux operative on said armature in such a manner as to cause said voltage reduction.

3. In combination, a direct current generator, a storage battery, a cutout for connecting and disconnecting said generator and said battery, a voltage regulator for said generator, and means responsive to the load current of said generator for modifying the action of said regulator in such a manner that as the load on the generator increases from no load its voltage is relatively abruptly reduced to a lower value which is held substantially constant by said regulator.

4. In combination, a direct current generator, a storage battery, a cutout for connecting and disconnecting said generator and said battery, a voltage regulator for said generator, means responsive to the load current of said generator for so modifying the action of said regulator that the no load voltage of said generator is higher than the voltage of said generator when it is carrying an appreciable load, and additional means responsive to the load on said generator for so modifying the action of said regulator that the voltage of said generator is relatively abruptly reduced when the load on said generator exceeds a predetermined value.

5. The combination, with a circuit including a generator, a storage battery and a cutout for connecting and disconnecting said generator and battery, of an automatic voltage regulator for said generator including means responsive to the current in said circuit for causing said regulator to produce successive abrupt droops in generator voltage for low and high current values in said circuit respectively, and for having substantially no effect on the voltage held by said regulator for currents intermediate said low and high values.

6. The combination, with a circuit including a generator, a storage battery and a cutout for connecting and disconnecting said generator and battery, of an automatic voltage regulator for said generator, a circuit voltage responsive operating magnet for said regulator, means including a circuit current responsive winding for causing said regulator to hold a lower voltage with load on said generator than at no load, the amount of voltage reduction produced by said means being substantially independent of the amount of load above no load, and means including a circuit current responsive winding for causing said regulator to lower the voltage of said generator when said generator is overloaded.

7. The combination, with a circuit including a generator, a storage battery and a cutout for connecting and disconnecting said generator and battery, of an automatic voltage regulator for said generator, a circuit voltage responsive operating magnet for said regulator, means including a circuit current responsive winding for causing said regulator to hold a lower voltage with load on said generator than at no load by means of magnetic saturation effects produced in said magnet, and means including a circuit current responsive winding for causing said regulator to lower the voltage of said generator when said generator is overloaded.

8. In combination, a generator, a load connected to be energized by said generator, and regulating means comprising a single magnetic structure and including a winding thereon continuously connected to be energized in accordance with the voltage of said generator throughout the operating range of said generator, a second winding thereon connected to be responsive to the current in said load, and means included in said regulator and operative solely in accordance with the energization of said second winding for causing said regulator to effect regulation of said generator substantially solely in accordance with the energization of the voltage winding over a predetermined range of current and predominately in accordance with the energization of the current winding for current in excess of said predetermined range of current.

9. In combination, a generator, an excitation circuit therefor, and regulating means comprising a magnetic structure and a single pair of relatively movable contacts for controlling the energization of said excitation circuit, a winding on said magnetic structure connected in shunt relation to said generator, a second winding on said magnetic structure connected in series relation with said generator and means included in said regulator and operative solely in accordance with the energization of said second winding for controlling the relative movement of said contacts so as to maintain the voltage of said generator substantially constant over a predetermined range of generator current and to decrease the voltage of said generator relatively abruptly as the current of said generator increases above said predetermined range of current.

10. In combination, a generator, an automatic regulator for said generator, said regulator having means including a voltage winding connected in shunt to said generator for regulating the voltage of said generator, a current winding connected in circuit with said generator for producing a flux which traverses a flux path common to the flux path traversed by the flux produced by said voltage winding, and means included in said regulator for controlling the total flux produced by said windings so that over a predetermined range of current in said current winding said regulator holds substantially constant generator voltage while for current in said current winding in excess of said range said regulator relatively abruptly reduces the voltage of said generator, this current winding producing flux both initiating said relatively abrupt reduction and controlling the continued voltage reduction for currents in excess of said range.

11. In combination, a generator, an automatic voltage regulator for said generator, said regulator comprising an electromagnet structure having a voltage winding connected in shunt to said generator and a current winding connected in series with said generator, and means responsive to the flux produced by said current winding for changing the magnetic reluctance of a portion of said structure included in the magnetic circuit of said voltage winding, said flux traversing said regulator in such a direction as to cause said regulator to reduce the voltage it holds after said change in magnetic reluctance occurs.

BENJAMIN R. TEARE, Jr.
MAX A. WHITING.